US012177634B2

(12) United States Patent
Thougaard et al.

(10) Patent No.: US 12,177,634 B2
(45) Date of Patent: Dec. 24, 2024

(54) ANTENNA FOR A BONE-ANCHORED HEARING AID

(71) Applicant: Oticon Medical A/S, Smørum (DK)

(72) Inventors: Morten Thougaard, Smørum (DK); Oleksandr Rybalko, Smørum (DK); Jens Troelsen, Smørum (DK); Rune Sø, Smørum (DK)

(73) Assignee: Oticon Medical A/S, Smørum (DK)

( * ) Notice: Subject to any disclaimer, the term of this patent is extended or adjusted under 35 U.S.C. 154(b) by 204 days.

(21) Appl. No.: 17/900,308

(22) Filed: Aug. 31, 2022

(65) Prior Publication Data

US 2023/0064076 A1 Mar. 2, 2023

(30) Foreign Application Priority Data

Sep. 1, 2021 (EP) .................................... 21194390

(51) Int. Cl.
*H04R 17/00* (2006.01)
*H04R 25/00* (2006.01)

(52) U.S. Cl.
CPC ........... *H04R 25/554* (2013.01); *H04R 17/00* (2013.01); *H04R 25/606* (2013.01); *H04R 2225/51* (2013.01)

(58) Field of Classification Search
CPC .... H04R 25/554; H04R 17/00; H04R 25/606; H04R 2225/51
See application file for complete search history.

(56) References Cited

U.S. PATENT DOCUMENTS

2017/0311103 A1* 10/2017 Webster ............... H04R 25/554
2021/0176573 A1* 6/2021 Rybalko ................. H01Q 1/273

FOREIGN PATENT DOCUMENTS

| | | | |
|---|---|---|---|
| EP | 3 836 568 | A1 | 6/2021 |
| WO | WO 03/021667 | A2 | 3/2003 |
| WO | WO 03/021667 | A3 | 3/2003 |

OTHER PUBLICATIONS

Extended European Search Report issued 21194390.7, dated Feb. 18, 2022.

* cited by examiner

*Primary Examiner* — Suhan Ni
(74) *Attorney, Agent, or Firm* — Birch, Stewart, Kolasch & Birch, LLP

(57) ABSTRACT

A bone-anchored hearing aid is disclosed. A bone-anchored hearing aid for a recipient may comprise an antenna configured to transmit and/or receive a wireless signal, an electronic circuit configured to receive the wireless signal, one or more vibrator leads, a vibrator configured for receiving an electrical signal from the electronic circuit via the one or more vibrator leads, and the vibrator may be configured to provide a vibrational stimulation to the recipient patient based on the electrical signal. Furthermore, the hearing aid includes a vibrator housing configured to accommodate at least the vibrator, and wherein each of the one or more vibrator leads may be connected to the vibrator and to the vibrator housing via a capacitance, and where the capacitance is configured to eliminate at least a parasitic coupling between the vibrator and the vibrator housing for improving the performance of the antenna.

17 Claims, 4 Drawing Sheets

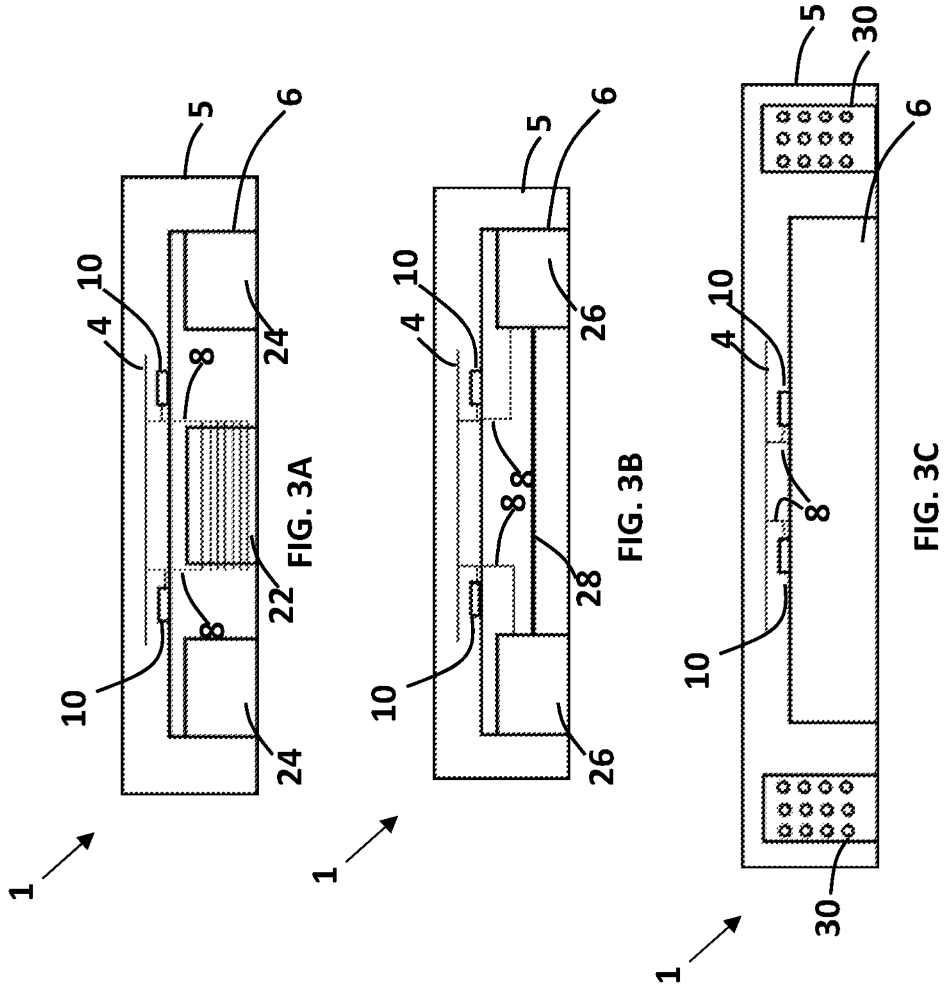
FIG. 3A
FIG. 3B
FIG. 3C
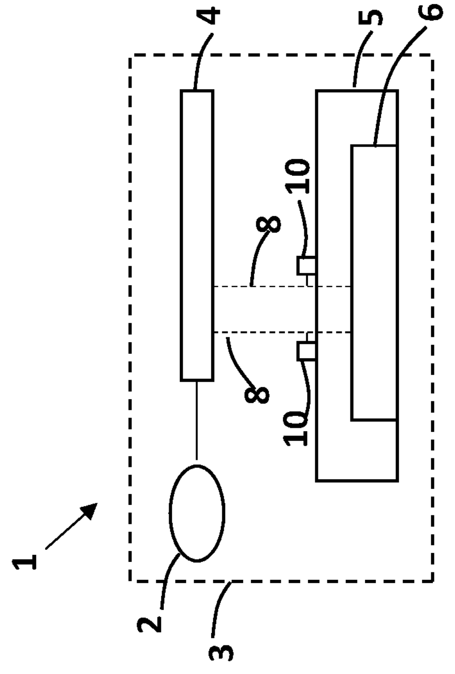
FIG. 2

ANTENNA FOR A BONE-ANCHORED HEARING AID

FIELD

The present disclosure relates a bone-anchored hearing aid. More particularly, the disclosure relates to a connection of an antenna and a vibrator of the bone-anchored hearing aid that results in removal of parasitic effects caused by the vibrator and which disturbance the performance of the antenna.

BACKGROUND

Hearing by bone conduction as a phenomenon, i.e., conduction of sound to the inner ear through the bones of the skull, is known. Electromagnetic vibrators combine properties such as small size, wide frequency range, and efficient energy transformation; hence, they are widely used in healing aid applications. Such vibrators include a coil unit, a permanent magnet, a mass unit, a bobbin unit, a spring unit and a vibrator plate. By superimposing a signal magnetic flux generated by the coil unit wound around the bobbin unit (central portion) the three in an air gap, between the vibrator plate and bobbin unit, is produced.

Piezoelectric vibrator in response to electrical impulses is configured to deform bone of the skull in the vicinity the piezoelectric transducer, and to thereby apply a compressional lateral stress to the bone to generate bone vibration to excite the movement of cochlear fluids. The piezoelectric vibrator may include a driver circuitry, which can for example include an inductive link, applies the electrical impulses to the piezoelectric transducer in response to sound waves detected by a microphone. The inductive link can comprise a transmitter coil for external placement and transcutaneous excitation of a complementary implanted receiver coil connected to the piezoelectric transducer, or the driver circuitry can be self-contained and configured for subcutaneous implantation.

A transcutaneous bone-anchored hearing aid device includes at least the electromagnetic vibrator and/or the piezoelectric vibrator which is implanted beneath the skin layers and fixated onto the skull of user, and in most cases the electromagnetic vibrator is coupled to another hosing including at least a receiver coil which is also implanted beneath the skin layers and fixated onto the skull of the user. The receiver coil may receive an external generated communication signal from an external device fixated onto the skin of the user with a magnetic force between a first magnet within the external device and a second magnet within the another housing.

A percutaneous bone-anchored hearing aid includes at least the electromagnetic vibrator and/or the piezoelectric vibrator which is applied onto an implanted abutment that transfer vibrations from the hearing aid in response to an electrical impulse caused by sound waves detected by a microphone and into the skull of which the implanted abutment is implanted into.

In a bone-anchored hearing aid the vibrator is typically the biggest or one of the biggest metallic components. This means that when designing an antenna for wireless communication between the bone-anchored hearing aid and an external device, such as a smartphone, the vibrator needs to be connected in a way that allows for the antenna to work in the presence of the vibrator. The vibrator may be arranged in a vibrator housing, and the vibrator may include components, such as magnets, coils, piezo-material and/or other kind of metallic component. The components may be electrically separated from the vibrator housing but there can be a significant parasitic capacitance between them. The coil and/or the piezoelectric component is fed through two lead wires, which may have a parasitic inductance. It is typically the vibrator housing of which is an electrically big component, whereas it is the coil and/or the piezoelectric component which is electrically connected to the electronics of the bone anchored hearing aid. With the parasitic capacitance between the coil piezoelectric component and the vibrator housing and with the parasitic inductance in the lead wires for the inductor, the connection between the electronics and the vibrator housing can exhibit resonant behavior at radio frequencies, which can damage the antenna performance and cause sample to sample variation in antenna performance.

Therefore, there is a need to provide a solution that addresses the above-mentioned problems. In particular, there is a need to provide a solution that allows a connection of the vibrator housing and the antenna that results in an improved performance of the antenna.

SUMMARY

According to an aspect of the present disclosure, a bone-anchored hearing aid for a recipient may comprise an antenna configured to transmit and/or receive a wireless signal, an electronic circuit configured to receive the wireless signal, one or more vibrator leads, a vibrator configured for receiving an electrical signal from the electronic circuit via the one or more vibrator leads, and the vibrator may be configured to provide a vibrational stimulation to the recipient patient based on the electrical signal. Furthermore, the hearing air includes a vibrator housing configured to accommodate at least the vibrator, and wherein each of the one or more vibrator leads may be connected to the vibrator and to the vibrator housing via a capacitance, and where the capacitance is configured to eliminate at least a parasitic coupling between the vibrator and the vibrator housing for improving the performance antenna.

Furthermore, by applying the capacitance to each of the one or more vibrator leads will result in an elimination or reduction of the parasitic capacitance between the vibrator and the vibrator housing and elimination or reduction of the parasitic inductance which appears in the one or more vibrator leads. Thereby, the parasitic coupling is either eliminated or reduced.

In one example, the electronic circuit may include an amplifier that provides an amplified stimulation signal that is transferred via the one or more vibrator leads to the vibrator, and the vibrator generates vibrational signals to the skull of the recipient of the hearing aid based on the amplified stimulation signal. During the transferring of the amplified stimulation signal the parasitic inductance is created and which affects the performance of the antenna in a negative way. Then, during the vibrational stimulation the parasitic coupling and which affects the performance of the antenna in a negative way resulting in a poor performance of the antenna. The parasitic coupling may include a parasitic capacitance and or a parasitic inductance, which are eliminated or reduced by applying the capacitance between the one or more vibration leads and the vibration housing.

The vibrator may include a piezoelectric actuator and/or an electromagnetic vibrator. In the case the vibrator includes both the piezoelectric actuator and the electromagnetic vibrator, the vibrator leads that may connect the piezoelectric actuator and the electromagnetic vibrator to the electronic circuit are some or all of them connected to the vibration housing via a capacitance. By applying a combination of an actuator and a vibrator within the vibrator housing will result in a larger vibrator housing, and that will increase the amount of parasitic effect. Therefore, it is even ore important to apply the capacitance to the connection the vibrator to the vibrator housing when applying two or more actuator and/or vibrators into the vibrator housing.

To reduce any disturbances to the antenna that are caused by the one or more vibrator leads, the one or more vibrator leads may be arranged on a flexible printed circuit board, and more specifically, between two shielding layers being part of the flexible printed circuit board. The flexible printed circuit board may include at least a first layer and a second layer, and wherein the one or more vibrator leads are arranged between the first layer and the second layer. The first layer and the second layer may be configured to shield the one or more vibrator leads from unwanted electromagnetic interference.

The capacitance that connects the one or more vibrator leads to the vibrator housing may be applied to a surface of the housing, and more specifically, onto an outer surface of the vibrator housing. Applying the capacitance to the outer surface of the vibrator housing results in a more optimal elimination of the parasitic effects caused by the vibrator housing, as a sufficiently large capacitance can be made in this context of small-size devices, e.g. when the capacitance is applied to the full outer surface of the vibrator housing.

The capacitance that connects the one or more vibrator leads to the vibrator housing may be designed so that the distance between the metal layer in the capacitive element and the vibrator housing is minimized. This results in a more optimal elimination or the parasitic effects.

The capacitance may include wherein the capacitance includes a stack of layers, comprising a first layer including a conductive material, and the first layer is connected to the electronic circuit via the one or more vibrator leads. The capacitance may include a second layer, wherein the first layer is arranged on a primary surface of the second layer, and wherein a secondary surface of the second layer is connected to the vibrator, and wherein the second layer is configured to provide the capacitive coupling between the first layer and the vibrator housing. The secondary surface of the second layer may be arranged on the vibrator housing. The secondary surface of the second layer may be arranged on an outer surface of the vibrator housing via an adhesive material or soldered onto. Each of the layers may be made of a flexible material which makes it possible to adapt the shape of the capacitance to a surface that may have a shape of any kind.

The vibrator may include a plurality of vibrator means, and the plurality of vibrator means may include at least a coil, a permanent magnet, and/or a piezo-element, and the one or more vibrator leads may be connected to one or more of the plurality of vibrator means.

Each of the one or more vibrator leads may be connected the vibrator housing via a capacitance and then to one or more of the plurality of vibrator means.

The size of the capacitance may be determined by the area of the conductive material of the first layer and a thickness of the second layer, or the area or the conductive material of the first layer and a thickness of the second layer and the adhesive material, or the area of each of the two separate sections of the first layer and a thickness of the second layer, or the area of each of the two separate sections of the first layer and a thickness of the second layer and a thickness of the adhesive material.

The vibrator housing may be the antenna unit or a ground plane to the antenna unit, or a parasitic resonator to the antenna unit, and where the capacitance may be configured to improve the performance of the antenna by removing unwanted resonances in the performance of the antenna.

When designing an antenna for a small device (relative to the wavelength), all larger metal components may influence the function of the antenna, so it can be attempted to utilize the larger metal components of the device (such as the vibrator housing) to improve the antenna, e.g. by feeding the vibrator housing and using it as antenna or using the vibrator housing as ground plane for the antenna.

The vibrator housing can also be used as a passive resonator (parasitic resonator), which will improve the antenna (typically by increasing the bandwidth of the antenna).

In an example where the vibrator housing is acting as an antenna, the or housing is connected to a radio frequency (RF) signal generator via the one or more vibrator leads, and the RF signal generator is configured to supply the vibrator housing with a radio frequency signal. The connection between the one or more vibrator leads and the RF signal generator may include a capacitor. In another example, the RF signal generator may be connected directly on the vibrator housing and to each of the capacitance that connects the one or more vibrator leads to the vibrator housing. The connection between each of the capacitance and the RF signal generator may include a capacitor. By using the vibrator housing as the antenna results in a more compact bone-anchored hearing aid as if the antenna and the vibrator housing are two separate units.

In an example where the vibrator housing and the antenna are two separate units, the RF signal generator is connected to one or more conductors having in total an electrical length of between lambda/2 and lambda/16.

The vibrator housing may include a first surface housing and at least a second surface housing, wherein the first surface housing is opposite to the at least second surface housing. When a recipient wears the bone-anchored hearing aid the at least second surface is arranged closer to the skin of the recipient than the first surface housing.

The bone-anchored hearing aid may include a first housing configured to accommodate the antenna, the electronic circuit, the one or more vibrator leads and/or the vibrator and the vibrator housing. The bone-anchored hearing aid may include a second housing configured to accommodate the antenna, the electronic circuit, the one or more vibrator leads and/or the vibrator and the vibrator housing. The first housing and the second housing may be connected mechanically and electrically. The first housing and/or the second housing may include a first main surface and at least a second main surface, wherein the first main surface is opposite to the at least second main surface. When a recipient wears the bone-anchored hearing aid the at least second main surface is arranged closer to the skin of the recipient than the first main surface.

The first housing and/or the second housing may be have a first end and a second end, and when the recipient is wearing the bone-anchored hearing aid the first end is closest to the mouth of the recipient than the second end.

For obtaining an optimal coverage of the antenna around the recipient, then the one or more conductors may preferably be arranged between the first main surface and the first surface housing. Thereby, any shadow effect of the antenna that may be caused by the components of the hearing aid is reduced.

For obtaining an optimal connection between a smartphone being in a pocket of the recipient and the bone-anchored hearing aid, it is an advantage to place the antenna between the vibrator housing and the first end, however, if placing the antenna between the vibrator housing and the second end, the antenna will see a significant shadow effect caused by the vibrator housing when trying to connect to the smartphone in the pocket of the recipient.

The vibrator housing may be decoupled by applying a decoupling mean to each of the one or more vibrator leads. The decoupling mean may be a decoupling coil having a self resonance frequency range at about 2.4 GHz band. The decoupling mean may be a cap coil circuit, a customized RF-chokes or a RF bead. In any of the examples, the self-resonance frequency range is about 2.4 GHz band. By decoupling the vibrator housing, the vibrator housing acts as a parasitic resonator for the antenna. That results in an improved bandwidth of the antenna.

The bone-anchored hearing aid may include a microphone unit configured to receive an acoustical wave, and wherein the electrical signal is generated by the electronic circuit is based on the acoustical wave, or, the electrical signal may be provided by a signal received by the antenna.

BRIEF DESCRIPTION OF DRAWINGS

Aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 2 illustrates an example of the bone-anchored hearing aid, and more specifically, a capacitance connected to a vibrator housing;

FIGS. 3A, 3B and 3C illustrate different examples of a vibrator;

DETAILED DESCRIPTION

Figures 1A, 1B, 1C:
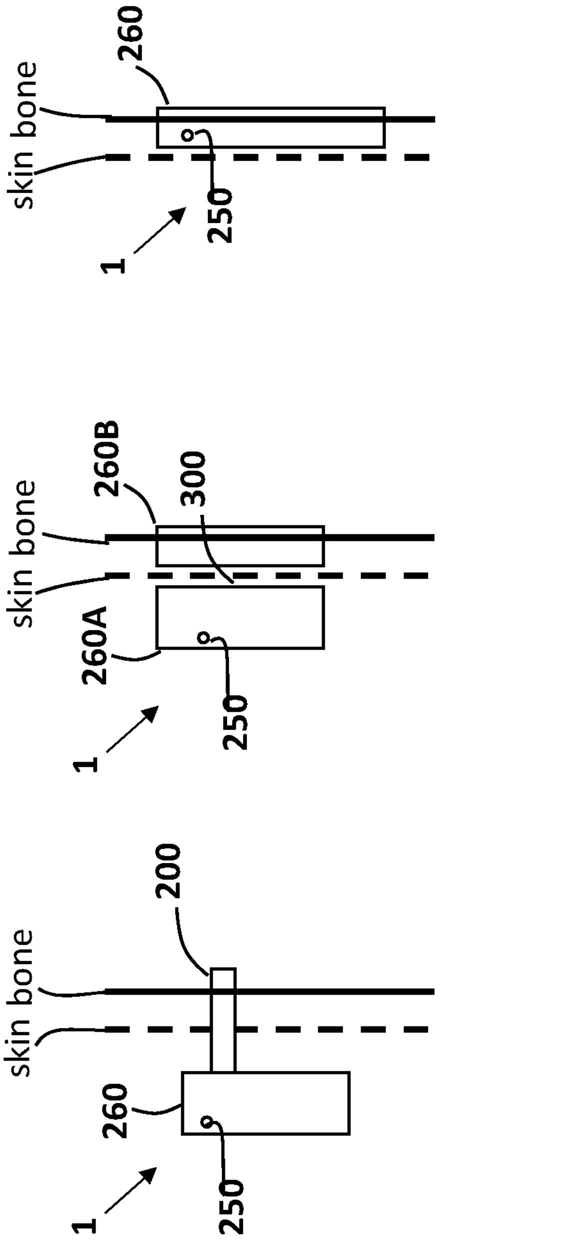
FIGS. 1A, 1B and 1C disclose examples of a bone-anchored hearing aid.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing device attached to a fixture implanted into the skull bone such as in Bone Anchored hearing Aid or Cochlear Implant, or iv) arranging a unit of the hearing device as an entirely or partly implanted unit such as in Bone Anchored Hearing Aid or Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, a PC. The audio gateway is further adapted to select and/or combine an appropriate one of the received audio signals tor combination of signals) for transmission to the at least One hearing device. The remote control is adapted to control functionality and operation of the at least one hearing devices. The function of the remote control may be implemented in a SmartPhone or other electronic device, the SmartPhone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one oi more output electrodes for providing the electric signals such as in a Cochlear Implant.

A "cochlea implant system" represents a particular type of a "hearing system" comprising an external unit, which receives acoustic sound and processes the acoustic sound into a coded audio, and an implantable unit which receives the coded audio signal.

Now referring to FIGS. 1A, 1B and 1C illustrating different examples of a bone-anchored hearing aid 1. FIG. 1A illustrates as bone-anchored hearing aid 1 having a microphone 250 and a housing 260 accommodating a vibrator (not shown). In this present example the bone-anchored hearing aid 1 is coupled to an implantable part 200 that penetrates the skin and screwed into a skull of a recipient of the bone-anchored hearing aid 1. The vibrations created by the vibrator is transferred to the skull via the abutment 200, and in this present example, the implantable part 200 is an abutment. FIG. 1B illustrates an example of the bone-anchored hearing aid 1 that includes an external part 260A and an implantable part 260B, where the implantable part 260B is implanted between the skin and the skull. The external part 260A and the implantable part 260B are attracted to each other via a magnetic force 300. In this present example, the vibrator is arranged in the implantable part 260B. FIG. 1C illustrates an example of the bone-anchored hearing aid 1 which is fully implantable between the skin and the skull of the recipient. In this present example, the vibrator is arranged within the housing 260.

FIG. 2 illustrates an example of the bone-anchored hearing aid 1 for a recipient. In the example, the hearing aid 1 includes an antenna 2 configured to transmit and/or receive a wireless signal, an electronic circuit 4 configured to receive the wireless signal, one or more vibrator leads 8, a vibrator 6 configured for receiving an electrical signal from the electronic circuit 4 via the on or more vibrator leads 8, and the vibrator 6 is configured to provide a vibrational stimulation to the recipient patient based on the electrical signal. Furthermore, the hearing aid 1 includes a vibrator housing 5 configured to accommodate at least the vibrator 6, and wherein each of the one or more vibrator leads 8 is connected to the vibrator 6 and to the vibrator housing 5 via a capacitance 10, and where the capacitance 10 is configured to eliminate at least a parasitic capacitance and/or a parasitic inductance within the parasitic coupling between the vibrator 6 and the vibrator housing 5 for improving the performance of the antenna 2. In this present example, the two vibrator leads is are used for transmitting power to the vibrator 6.

In the present example illustrated FIG. 2, the capacitance 10 is arranged on an outer surface of the vibrator housing 5.

FIGS. 3A, 3B and 3C illustrate different examples of the vibrator 5. In FIG. 3A, the vibrator 6 is an electromagnetic vibrator that includes a coil unit 22, and at least a permanent magnet 24. The two vibrator leads 8 are connected to the coil unit 22 supplying current to the coil unit 22 for generating vibrations. In FIG. 3B, the vibrator 6 is a piezoelectric vibrator that includes a unit 26 and a layered piezoelectric unit 28, and wherein the unit 26 includes a mass and an electrical connection to the layered piezoelectric unit 28. In this present example, the two vibrator leads 8 are connected to the piezoelectric unit 28 via the electrical connection in the unit 26. FIG. 3C illustrates an example where the implantable part 260B of the bone-anchored hearing aid 1 includes the vibrator housing 6, and the implantable put includes an inductive coil interface 30 configured to communicate with the external part 260A of the bone-anchored hearing aid 1. In this example, the vibrator housing 5 is circumference by the inductive coil interface 30. In all three examples illustrated in FIGS. 3A to 3C, the capacitance 10 are applied onto an outer surface of the vibrator housing 5 In another example, the capacitance 10 may be applied onto an inner surface of the vibrator housing 5 for the purpose of utilizing available free space within the housing 5, and thereby, avoiding extension of the size of vibrator housing 5.

The antenna 2 may be configured to communicate with a smartphone or any other external communication devices. The antenna 2 may be part of the electronic circuit 4, and in this example, the electronic circuit 4 is arranged between the vibrator housing 5 and an outer surface of a housing that includes the vibrator housing 5, and the outer surface of the housing is directed away from the skin of the recipient of the hearing aid 1.

In any example of bone-anchored hearing aid 1, the vibrator 6 may include a piezoelectric actuator and/or an electromagnetic vibrator. In a hybrid version of the vibrator 6, the vibrator 6 includes both the piezoelectric and an electromagnet vibrator.

Figure 4:
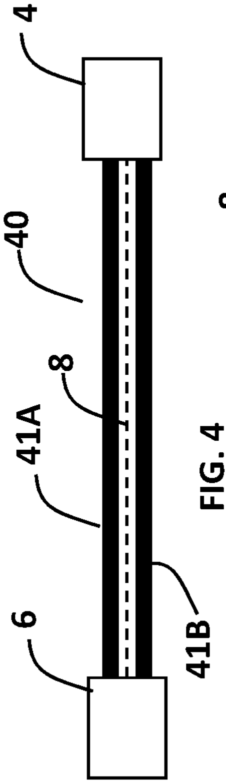
FIG. 4 illustrates an example of one or more vibrator leads.

FIG. 4 illustrates an example of a vibrator lead 8 of the one or more vibrator leads 8. In this present example, the vibrator leads 8 are arranged on or in a flexible printed circuit board 40, where the flexible printed circuit board 40 includes at least a first layer 41A and a second layer 41B, and where the vibrator leads 8 are arranged between the first and the second layer (41A, 41B). The electrical length of the antenna 2 may be extended by the vibrator leads 8, and in this present example, the layers (41A, 41B) may be configured to protect the vibrator leads 8 from unwanted electromagnetic interference.

Figure 5A:
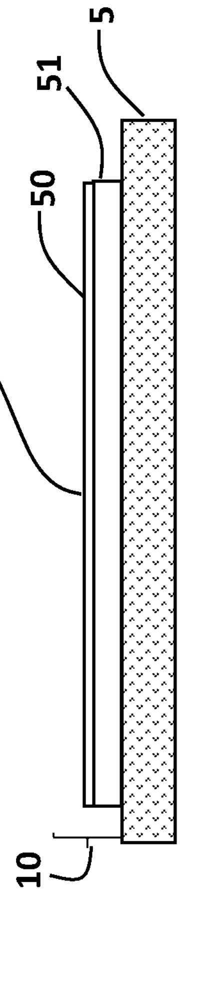
FIGS. 5A, 5B and 5C illustrate examples of a capacitance being connected to a vibrator housing.
Figure 5B:
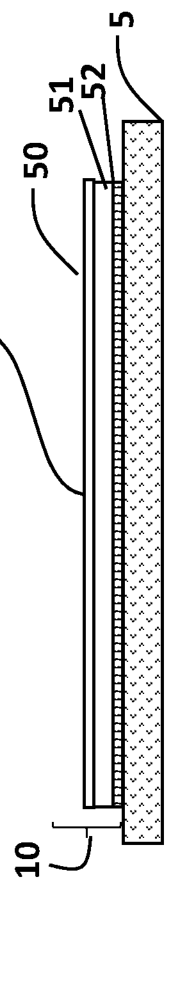
Figure 5C:
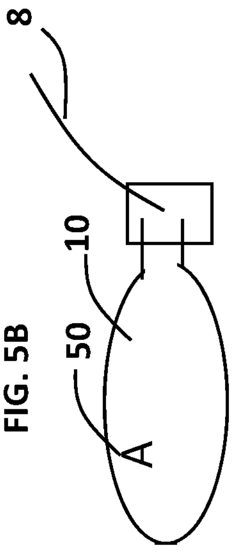

FIGS. 5A, 5B and 5C illustrate examples of the capacitance 10 being connected to a surface of the vibrator housing 6. In FIGS. 5A and 5B, the capacitance 10 includes a stack of layers that comprises a first layer 50 including a conductive material, and the first layer is connected to the electronic circuit 4 via the one or more vibrator leads 8. Furthermore the stack includes a second layer 51, wherein the first layer 50 is arranged on a primary surface of the second layer 51, and wherein a secondary surface of the second layer 51 is connected to the vibrator housing 5. The second layer 51 is configured to provide the capacitive coupling between the first layer 50 and the vibrator housing 5. In FIG. 5B, the second layer 51 is applied onto the surface of the housing 5 via an adhesive material 52.

FIG. 5C illustrates the capacitance where the electrical size of the capacitance is determined by the area (A) of the conductive material of the first layer 50, or by the area of the conductive material of the first layer 50 and a thickness of the second layer 51 and the adhesive material 52. In another example the first layer 50 may be divided into multiple separate sections and where each of the separate sections is connected to a vibrator lead 8. The total area of the multiple separate sections of the first layer 50 and a thickness of the second layer 51 determines the electrical size of the capacitance 10. The area of the first layer is defined as being an area of a surface. In yet another example, the electrical size is determined by the area of each of the multiple separate sections of the first layer and a thickness of the second layer and a thickness of the adhesive material.

Figure 6A:
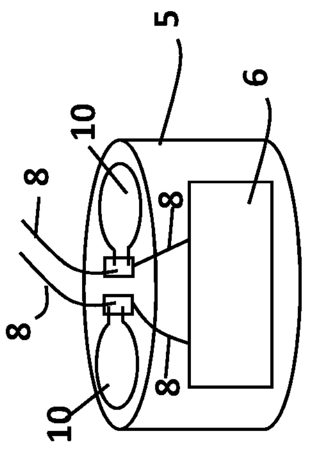
FIGS. 6A and 6B illustrate examples of a connection between a capacitance and a vibrator housing.
Figure 6B:
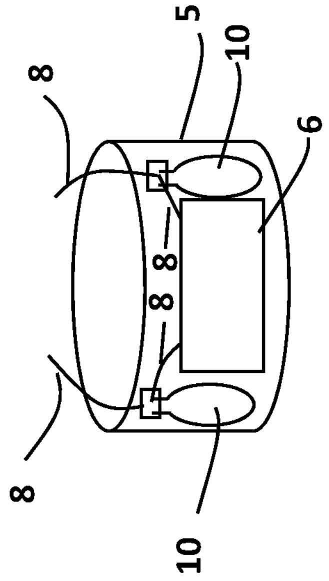

FIGS. 6A and 6B illustrate an example of where the capacitance 10 for each vibrator lead 8 is connected to a top surface (see FIG. 6A) or a side surface (see FIG. 6B) of the vibrator housing 5. In yet another example, the capacitance 10 may be connected on both the top surface and the side surface of the vibrator housing 5. In both examples, each vibrator lead 8 is connected to the capacitance 10 and the vibrator 6. The first layer 50 may be a pad connectable to a vibrator lead 8 and configured to extend the vibrator lead 8 to the vibrator 6.

Figures 7A, 7B, 7C, 7D:
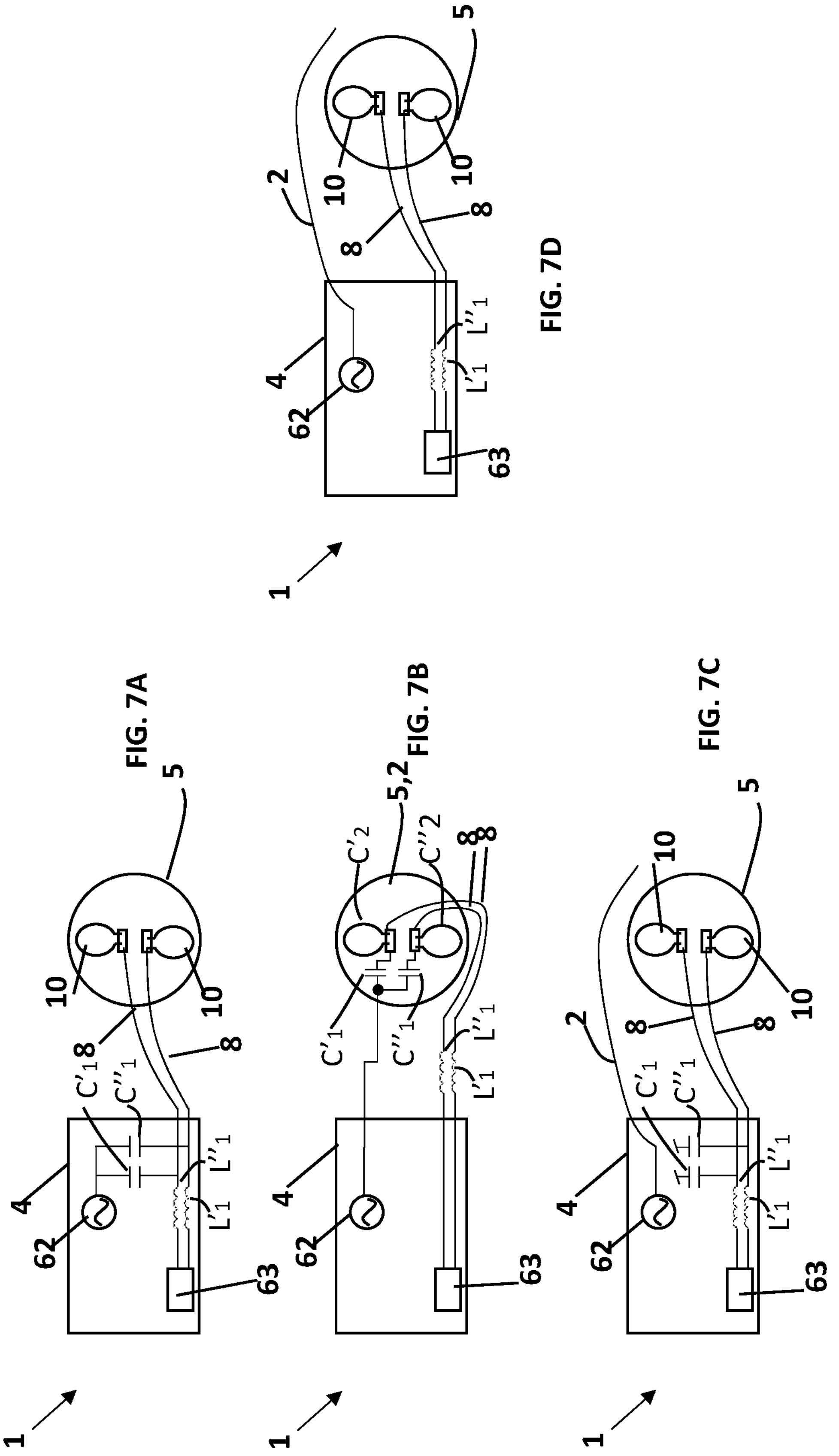
FIGS. 7A, 7B, 7C and 7D illustrate examples of different configurations of a vibrator housing.

FIGS. 7A to 7C illustrate different examples of the antenna configuration of the antenna 2 and the configuration of the vibrator housing 6. The vibrator housing is the antenna unit 2, or a ground plane to the antenna unit 2, or a parasitic resonator to the antenna unit 2, and where the capacitance is configured to improve the performance of the antenna 2 by removing unwanted resonances in the performance of the antenna 2. In FIGS. 7A and 7B, the bone-anchored hearing aid 1 includes an antenna supplier 62 that is configured to supply power to the antenna 2. The antenna supplier 62 is connected to the one or more vibrator leads 8 via capacitance ($C'_1$, $C''_1$), and each of the one or more vibrator leads 8 is decoupled at a resonance frequency of the antenna unit 2 via an inductive coil ($L'_1$, $L''_1$). In FIG. 7A the capacitance ($C'_1$, $C''_1$) and the inductive coil ($L'_1$, $L''_1$) are arranged on the electronic circuit 4, and in FIG. 7B, the capacitance ($C'_1$, $C''_1$) is arranged outside the electronic circuit 4. More specifically, the capacitance ($C'_1$, $C''_1$) may be arranged on the vibrator housing 5 as illustrated I FIG. 7B. In yet another example, the decoupling coils ($L'_1$, $L''_1$) may be arranged outside the electronic circuit 4. In FIG. 7C, the vibrator housing 5 is acting as a ground plane for the antenna 2, and in this present example the capacitance ($C'_1$, $C''_1$) is connected to a ground and to a vibrator load 8. In this present example the antenna 2 is not the vibrator lead 8 but instead an antenna wire being a monopole antenna. In FIG. 7D the vibrator lead 8 is decoupled ($L'_1$, $L''_1$) but not connected to capacitance ($C'_1$, $C''_1$), and in this example, the vibrator housing 5 is as parasitic resonator to the antenna 2. That results in an improved bandwidth of the antenna 2.

A Cochlear hearing aid implant typically includes i) an external part for picking up and processing sound from the environment, and for determining sequences of pulses for stimulation of the electrodes in dependence on the current input sound, ii) a (typically wireless, e.g. inductive) communication link for simultaneously transmitting information about the stimulation sequences and for transferring energy to iii) an implanted part allowing the stimulation to be generated and applied to a number of electrodes, which are implantable in different locations of the cochlea allowing a stimulation of different frequencies of the audible range. Such systems are for example described in U.S. Pat. No. 4,207,441 and in U.S. Pat. No. 4,532,930.

In an aspect, the hearing device comprises multi-electrode array e.g., in the form of a carrier comprising a multitude of electrodes adapted for being located in the cochlea in proximity of an auditory nerve of the user. The carrier is preferably made of a flexible material to allow proper positioning of the electrodes in the cochlea such that the electrodes may be inserted in cochlea of a recipient. Preferably, the individual electrodes are spatially distributed along the length of the carrier to provide a corresponding spatial distribution along the cochlear nerve in cochlea when the carrier is inserted in cochlea.

In still a further aspect, the functions may be stored on or encoded as one or more instructions or code on a tangible computer-readable medium. The computer readable medium includes computer storage media adapted to store a computer program comprising program codes, which when run on a processing system causes the data processing system to perform at least some (such as a majority or all) of the steps of the method described above, in the and in the claims.

As already outlined above, the above described method, including all corresponding exemplary embodiments, for a cochlear implant system may be implemented in software.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “include,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element but an intervening elements may also be present, unless expressly stated otherwise. Furthermore, “connected” or “coupled” as used herein may include wirelessly connected or coupled. As used herein, the term “and/or” includes any and all combinations of one or more of the associated listed items. The steps of any disclosed method is not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A bone-anchored hearing aid for a recipient comprising:

- an antenna configured to transmit and/or receive a wireless signal,
- an electronic circuit configured to receive the wireless signal,
- one or more vibrator leads,
- a vibrator configured for receiving an electrical signal from the electronic circuit via the one or more vibrator leads, and the vibrator is configured to provide a vibrational stimulation to the recipient patient based on the electrical signal, and
- a vibrator housing configured to accommodate at least the vibrator, and
- wherein each of the one or more vibrator leads is connected to the vibrator and to the vibrator housing via a capacitance, and where the capacitance is configured to eliminate at least a parasitic coupling between the vibrator and the vibrator housing for improving the performance of the antenna; and
- wherein the capacitance includes a stack of layers, comprising:
- first layer including a conductive material, and the first layer is connected to the electronic circuit via the one or more vibrator leads,
- a second layer wherein the first layer is arranged on a primary surface of the second layer, and wherein a secondary surface of the second layer is connected to the vibrator housing, and
- wherein the second layer is configured to provide the capacitive coupling between the first layer and the vibrator housing.

2. A bone-anchored hearing aid according to claim 1, wherein the vibrator includes a piezoelectric actuator and/or an electromagnetic vibrator.

3. A bone-anchored hearing aid according to claim 2, wherein the capacitance is arranged on an outer surface of the vibrator housing.

4. A bone-anchored hearing aid according to claim 2, wherein the vibrator includes a plurality of vibrator means, and the plurality of vibrator means includes at least a coil, a permanent magnet, and/or a piezo-element, and the one or more vibrator leads is connected to one or more of the plurality of vibrator means.

5. A bone-anchored hearing aid according to claim 2, wherein the vibrator housing is the antenna unit, or a ground plane to the antenna unit, or a parasitic resonator to the antenna unit, and where the capacitance is configured to improve the performance of the antenna by removing unwanted resonances in the performance of the antenna.

6. A bone-anchored hearing aid according to claim 1, wherein the capacitance is arranged on an outer surface of the vibrator housing.

7. A bone-anchored hearing aid according to claim 6, wherein the vibrator includes a plurality of vibrator means, and the plurality of vibrator means includes at least a coil, a permanent magnet, and/or a piezo-element, and the one or more vibrator leads is connected to one or more of the plurality of vibrator means.

8. A bone-anchored hearing aid according to claim 1, wherein the vibrator includes a plurality of vibrator means, and the plurality of vibrator means includes at least a coil, a permanent magnet, and/or a piezo-element, and the one or more vibrator leads is connected to one or more of the plurality of vibrator means.

9. A bone-anchored hearing aid according to claim 1, wherein the secondary surface of the second layer is arranged on an outer surface of the vibrator housing via an adhesive material.

10. A bone-anchored hearing aid according to claim 1, wherein an electrical size of the capacitance is determined by:

- the area of the conductive material of the first layer and a thickness of the second layer, or
- the area of the conductive material of the first layer and a thickness of the second layer and the adhesive material, or
- the area of each of two separate sections of the first layer and a thickness of the second layer, or
- the area of each of the two separate sections of the first layer and a thickness of the second layer and a thickness of the adhesive material.

11. A bone-anchored hearing aid according to claim 1, wherein the vibrator housing is the antenna unit, or a ground plane to the antenna unit, or a parasitic resonator to the antenna unit, and where the capacitance is configured to improve the performance of the antenna by removing unwanted resonances in the performance of the antenna.

12. A bone-anchored hearing aid according to claim 1, wherein the one or more vibrator leads are arranged in a flexible printed circuit board, wherein the flexible printed circuit board includes at least a first layer and a second layer, and wherein the one or more vibrator leads are arranged between the first layer and the second layer.

13. A bone-anchored hearing aid according to claim 12, wherein the first layer and the second layer are configured to shield the one or more vibrator leads from unwanted electromagnetic interference.

14. A bone-anchored hearing aid according to claim 1, wherein the vibrator is decoupled from the electronic circuit via decoupling means.

15. A bone-anchored hearing aid according to claim 14, wherein the decoupling means include a coil or another resonant decoupling component.

16. A bone-anchored hearing aid according to claim 1, comprising a microphone unit configured to receive an acoustical wave, and wherein the electrical signal is provided based on the acoustical wave, or, the electrical signal is provided by a signal received by the antenna.

17. A bone-anchored hearing aid according to claim 1, wherein the vibrator includes a plurality of vibrator means, and the plurality of vibrator means includes at least a coil, a permanent magnet, and/or a piezo-element, and the one or more vibrator leads is connected to one or more of the plurality of vibrator means.

* * * * *